United States Patent [19]
Cohen et al.

[11] Patent Number: 5,336,452
[45] Date of Patent: Aug. 9, 1994

[54] PROCESS FOR HYDROSONICALLY AREA EMBOSSING THIN THERMOPLASTIC FILM MATERIALS

[75] Inventors: Bernard Cohen, Berkley Lake; Lee K. Jameson, Roswell, both of Ga.

[73] Assignee: Kimberly-Clark Corporation, Neenah, Wis.

[21] Appl. No.: 950,095

[22] Filed: Sep. 23, 1992

[51] Int. Cl.$^5$ ............................................. B29C 59/00
[52] U.S. Cl. ........................................ 264/23; 264/284
[58] Field of Search ................... 264/23, 210.4, 210.2, 264/280, 284, 285, 293, 339; 425/174.2

[56] References Cited

U.S. PATENT DOCUMENTS

| | | | |
|---|---|---|---|
| Re. 33,063 | 9/1989 | Obeda | 425/174.2 |
| 1,982,587 | 11/1934 | Wilkins | 204/6 |
| 2,289,177 | 7/1942 | Chandler | 154/43 |
| 2,533,609 | 12/1950 | Nolan et al. | 18/47.5 |
| 2,740,184 | 4/1956 | Thomas | 28/78 |
| 3,025,585 | 3/1962 | Griswold | 28/1 |
| 3,097,149 | 7/1963 | Lacroix | 204/146 |
| 3,155,460 | 11/1964 | Mears | 29/183.5 |
| 3,253,317 | 5/1966 | Such | 28/76 |
| 3,333,032 | 7/1967 | Dickinson | 264/22 |
| 3,352,769 | 11/1967 | Ruben | 204/143 |
| 3,400,188 | 9/1968 | Olson | 264/156 |
| 3,451,884 | 6/1969 | Anno et al. | 161/53 |
| 3,488,240 | 1/1970 | Roberts | 156/73 |
| 3,571,679 | 3/1971 | VanTurnhout | 317/262 |
| 3,575,752 | 4/1971 | Carpenter | 156/73 |
| 3,594,134 | 7/1971 | Russell et al. | 29/191.4 |
| 3,635,609 | 1/1972 | Balamuth | 264/23 |
| 3,640,786 | 2/1972 | Carpenter | 156/73 |
| 3,642,967 | 2/1972 | Doll | 264/51 |
| 3,660,186 | 5/1972 | Sager et al. | 156/73 |
| 3,683,736 | 8/1972 | Loose | 83/16 |
| 3,713,960 | 1/1973 | Cochran, II | 161/66 |
| 3,723,754 | 3/1973 | Murayama et al. | 307/88 ET |
| 3,756,880 | 9/1973 | Graczyk | 156/73 |
| 3,790,652 | 2/1974 | Collin et al. | 264/146 |
| 3,794,174 | 2/1974 | Booman et al. | 210/321 |
| 3,814,101 | 6/1974 | Kozak | 128/287 |
| 3,818,522 | 6/1974 | Schuster | 5/347 |
| 3,832,267 | 8/1974 | Chia-Seng Liu | 161/116 |
| 3,839,525 | 10/1974 | Doll | 264/154 |
| 3,881,489 | 5/1975 | Hartwell | 128/287 |
| 3,886,941 | 6/1975 | Duane et al. | 128/287 |
| 3,929,135 | 12/1975 | Thompson | 128/287 |
| 3,949,127 | 4/1976 | Ostermeier et al. | 428/137 |
| 3,956,450 | 5/1976 | Abe et al. | 264/286 |
| 3,963,309 | 6/1976 | Schwab | 264/284 |
| 3,966,519 | 6/1976 | Mitchell et al. | 156/73.1 |
| 3,989,867 | 11/1976 | Sisson | 428/132 |
| 3,998,916 | 12/1976 | Van Turnhout | 264/22 |
| 4,028,033 | 6/1977 | Bryant | 264/284 |
| 4,105,724 | 8/1978 | Talbot | 261/112 |
| 4,215,682 | 8/1980 | Kubik et al. | 128/205.29 |
| 4,242,392 | 12/1980 | Yackiw | 428/85 |
| 4,311,542 | 1/1982 | Mueller et al. | 156/84 |

(List continued on next page.)

FOREIGN PATENT DOCUMENTS

| | | |
|---|---|---|
| 0141556 | 5/1985 | European Pat. Off. |
| 0195113 | 9/1986 | European Pat. Off. |
| 0203820 | 12/1986 | European Pat. Off. |
| 0256717A2 | 2/1988 | European Pat. Off. |

(List continued on next page.)

OTHER PUBLICATIONS

Copies of European Search Reports.
"Ultrasonics/High Power", Kirk-Othmer *Encyclopedia of Chemical Technology*, vol. 23, pp. 462–479, ©1983.

(List continued on next page.)

*Primary Examiner*—Catherine Timm
*Attorney, Agent, or Firm*—Joseph P. Harps

[57] ABSTRACT

The method includes the steps of (1) placing the thin thermoplastic film material on a pattern anvil having a pattern of raised areas wherein the height of the raised areas is generally less than the thickness of the film material; (2) conveying the thermoplastic film material, while placed on the pattern anvil, through an area where a liquid is applied to the film material; and (3) subjecting the thermoplastic film material to a sufficient amount of ultrasonic vibrations in the area where the liquid is applied to the film material to emboss the film material in a pattern generally the same as the pattern of raised areas on the pattern anvil.

26 Claims, 4 Drawing Sheets

U.S. PATENT DOCUMENTS

| | | | |
|---|---|---|---|
| 4,369,219 | 1/1983 | Goepp et al. | 428/138 |
| 4,375,718 | 3/1983 | Wadsworth et al. | 29/592 |
| 4,388,422 | 6/1983 | Gerteisen et al. | 523/137 |
| 4,389,211 | 6/1983 | Lenaghan | 604/383 |
| 4,406,720 | 9/1983 | Wang et al. | 425/174.2 |
| 4,414,045 | 11/1983 | Wang et al. | 156/73.2 |
| 4,414,244 | 11/1983 | Timberlake et al. | 427/105 |
| 4,438,167 | 3/1984 | Schwarz | 428/138 |
| 4,439,475 | 3/1984 | Lang | 428/92 |
| 4,472,328 | 9/1984 | Sugimoto et al. | 264/41 |
| 4,488,928 | 12/1984 | Ali Khan et al. | 156/495 |
| 4,588,537 | 5/1986 | Klaase et al. | 264/22 |
| 4,592,815 | 6/1986 | Nakao | 204/165 |
| 4,601,868 | 7/1986 | Radel et al. | 264/504 |
| 4,605,454 | 8/1986 | Sayovitz et al. | 156/73.1 |
| 4,609,518 | 9/1986 | Curro et al. | 264/504 |
| 4,623,438 | 11/1986 | Felton et al. | 204/168 |
| 4,629,643 | 12/1986 | Curro et al. | 428/131 |
| 4,645,500 | 2/1987 | Steer | 604/378 |
| 4,695,422 | 9/1987 | Curro et al. | 264/504 |
| 4,731,282 | 3/1988 | Tsukagoshi et al. | 428/220 |
| 4,735,843 | 4/1988 | Noda | 428/13 |
| 4,747,895 | 5/1988 | Wallerstein et al. | 156/73.3 |
| 4,775,571 | 10/1988 | Mizuno et al. | 428/141 |
| 4,777,073 | 10/1988 | Sheth | 428/155 |
| 4,778,644 | 10/1988 | Curro et al. | 264/557 |
| 4,798,604 | 1/1989 | Carter | 604/383 |
| 4,801,379 | 1/1989 | Ehrsam et al. | 210/498 |
| 4,815,714 | 3/1989 | Douglas | 264/22 |
| 4,842,794 | 6/1989 | Hovis et al. | 264/145 |
| 4,898,761 | 2/1990 | Dunaway et al. | 428/137 |
| 4,900,317 | 2/1990 | Buell | 604/370 |
| 4,929,319 | 5/1990 | Dinter et al. | 204/164 |
| 4,931,343 | 6/1990 | Becker et al. | 428/95 |
| 4,944,854 | 7/1990 | Felton et al. | 204/168 |
| 4,955,164 | 9/1990 | Hashish et al. | 51/321 |
| 4,980,215 | 12/1990 | Schonbrun | 428/72 |
| 4,995,930 | 2/1991 | Merz et al. | 156/209 |
| 5,015,521 | 5/1991 | Fujii et al. | 428/220 |
| 5,059,454 | 10/1991 | Todd et al. | 427/259 |
| 5,098,755 | 3/1992 | Tanquary et al. | 428/35.5 |
| 5,116,662 | 5/1992 | Morman | 428/198 |
| 5,225,018 | 7/1993 | Zeldin et al. | 156/167 |

FOREIGN PATENT DOCUMENTS

| | | | |
|---|---|---|---|
| 0259003 | 3/1988 | European Pat. Off. | |
| 0283844 | 9/1988 | European Pat. Off. | |
| 0301599 | 2/1989 | European Pat. Off. | B29D 28/00 |
| 0302611A1 | 2/1989 | European Pat. Off. | |
| 0535581 | 4/1993 | European Pat. Off. | B26F 1/26 |
| 3723404A1 | 1/1989 | Fed. Rep. of Germany. | |
| 4130961 | 3/1992 | Fed. Rep. of Germany | B29D 28/00 |
| 1334711 | 7/1963 | France. | |
| 50-38755 | 12/1975 | Japan. | |
| 9200798 | 1/1992 | PCT Int'l Appl. | B01D 67/00 |
| 1018971 | 2/1966 | United Kingdom. | |
| 1073605 | 6/1967 | United Kingdom. | |
| 1253664 | 11/1971 | United Kingdom. | |
| 2124134B | 2/1984 | United Kingdom. | |
| 2218990A | 11/1989 | United Kingdom. | |

OTHER PUBLICATIONS

"Crop Control", *Modern Plastics,* May 1991, pp. 58–60.

Translation of Japanese Patent Application No. HE13(1991)-260160

"Recent Progress in Electret Research", *Topics in Applied Physics,* vol. 33, 2nd ed., 1987, pp. 383–431.

Electrets and Related Electrostatic Charge Storage Phenomena, ©1968 by The Electrochemical Society, Inc.

Sonochemistry: The Uses of Ultrasound in Chemistry, Mason, T. J., Royal Society of Chemistry, pp. 83, 85.

Three miscellaneous pages, numbers 6, unnumbered, and 16.

PROCESS FOR HYDROSONICALLY AREA EMBOSSING THIN THERMOPLASTIC FILM MATERIALS

RELATED APPLICATIONS

Other patent applications dealing with applications of hydrosonics by the present inventors include U.S. patent application Ser. No. 07/769,050 entitled "Hydrosonically Microapertured Thin Thermoset Sheet Materials"; U.S. patent application Ser. No. 07/769,047 entitled "Hydrosonically Microapertured Thin Thermoplastic Sheet Materials"; U.S. patent application Ser. No. 07/768,782 entitled "Pressure Sensitive Valve System and Process For Forming Said System"; U.S. patent application Ser. No. 07/768,494 entitled "Hydrosonically Embedded Soft Thin Film Materials and Process For Forming Said Materials"; U.S. patent application number 07/768,788 entitled "Hydrosonically Microapertured Thin Naturally Occurring Polymeric Sheet Materials and Method of Making the Same"; U.S. patent application Ser. No. 07/769,048 entitled "Hydrosonically Microapertured Thin Metallic Sheet Materials"; U.S. patent application Ser. No. 07/769,045 entitled "Process For Hydrosonically Microaperturing Thin Sheet Materials"; and U.S. patent application Ser. No. 07/767,727 entitled "Process For Hydrosonically Area Thinning Thin Sheet Materials". This first group of applications was filed on Sep. 30, 1991. All of these applications are hereby incorporated by reference.

Additional applications, by the present inventors, directed to applications of hydrosonic energy which are being filed contemporaneously with the present application include U.S patent application Ser. No. 07/949,606, entitled "Process for Forming Electret Filter Media and Electret Filter Media"; U.S. patent application Ser. No. 07/950,100 entitled "Hydrosonically Bonded Nonwoven/Paper Material and Process for Forming the Same"; U.S. patent application Ser. No. 07/949,316 entitled "Method for Forming a Net-Like Material From a Thermoplastic Film"; and U.S. patent application Ser. No. 07/950,582 entitled "Method for Forming Ultra-Microapertures in Thin Thermoplastic Film Materials and Products Formed Thereby". All of these applications are hereby incorporated by reference.

FIELD OF THE INVENTION

The field of the present invention encompasses processes for area embossing thin thermoplastic film materials and thin thermoplastic film materials which have been provided with embossed areas.

BACKGROUND OF THE INVENTION

Ultrasonics is basically the science of the effects of sound vibrations beyond the limit of audible frequencies. Ultrasonics has been used in a wide variety of applications. For example, ultrasonics has been used for (1) dust, smoke and mist precipitation; (2) preparation of colloidal dispersions; (3) cleaning of metal parts and fabrics; (4) friction welding; (5) the formation of catalysts; (6) the degassing and solidification of molten metals; (7) the extraction of flavor oils in brewing; (8) electroplating; (9) drilling hard materials; (10) fluxless soldering and (10) nondestructive testing such as in diagnostic medicine.

The object of high power ultrasonic applications is to bring about some permanent physical change in the material treated. This process requires the flow of vibratory power per unit of area or volume. Depending on the application, the power density may range from less than a watt to thousands of watts per square centimeter. Although the original ultrasonic power devices operated at radio frequencies, today most operate at 20–69 kHz.

The piezoelectric sandwich-type transducer driven by an electronic power supply has emerged as the most common source of ultrasonic power; the overall efficiency of such equipment (net acoustic power per electric-line power) is typically greater than 70%. The maximum power from a conventional transducer is inversely proportional to the square of the frequency. Some applications, such as cleaning, may have many transducers working into a common load.

Other, more particular areas where ultrasonic vibratory force has been utilized are in the areas of thin nonwoven webs and thin films. For example, ultrasonic force has been used to bond or weld nonwoven webs. See, for example, U.S. Pat. Nos. 3,575,752 to Carpenter, 3,660,186 to Sager et al., 3,966,519 to Mitchell et al. and 4,695,454 to Sayovitz et al. which disclose the use of ultrasonics to bond or weld nonwoven webs. U.S. Pat. No. 3,488,240 to Roberts, describes the use of ultrasonics to bond or weld thin films such as oriented polyesters.

Ultrasonic force has also been utilized to aperture nonwoven webs. See, for example, U.S. Pat. Nos. 3,949,127 to Ostermeier et al. and 3,966,519 to Mitchell et al..

Lastly, ultrasonic force has been used to aperture thin film material. See, for example, U.S. Pat. No. 3,756,880 to Graczyk.

Other methods for the aperturing of thin film have been developed For example U.S. Pat. No. 4,815,714 to Douglas discusses the aperturing of a thin film by first abrading the film, which is in filled and unoriented form, and then subjecting the film to corona discharge treatment.

One of the difficulties and obstacles in the use of ultrasonic force in the formation of apertures in materials is the fact that control of the amount of force which is applied was difficult. This lack of control resulted in the limitation of ultrasonic force to form large apertures as opposed to small microapertures. Such an application is discussed in U.K. patent application number 2,124,134 to Blair. One of the possible reasons that ultrasonics has not found satisfactory acceptance in the area of microaperture formation is that the amount of vibrational energy required to form an aperture often resulted in a melt-through of the film.

As has previously been stated, those in the art had recognized that ultrasonics could be utilized to form apertures in nonwoven webs. See, U.S. patent to Mitchell, et al.. Additionally, the Mitchell et al. patent discloses that the amount of ultrasonic energy being subjected to a nonwoven web could be controlled by applying enough of a liquid to the area at which the ultrasonic energy was being applied to the nonwoven web so that the liquid was present in uncombined form. Importantly, the Mitchell, et al. patent states that the liquid is moved by the action of the ultrasonic force within the nonwoven web to cause aperture formation in the web by fiber rearrangement and entanglement. The Mitchell et al. patent also states that, in its broadest aspects, since these effects are obtained primarily through physical movement of fibers, the method of their invention may be utilized to bond or increase the strength of a wide variety of fibrous webs.

While the discovery disclosed in the Mitchell et al. patent, no doubt, was an important contribution to the art, it clearly did not address the possibility of area embossing of nonfibrous thin thermoplastic films or materials having fibers in such a condition that they could not be moved or rearranged. This fact is clear because the Mitchell et al. patent clearly states the belief that the mechanism of aperture formation depended upon fiber rearrangement. Of course, thin films do not have fibers which can be rearranged. Accordingly, it can be stated with conviction that the applicability of a method for area embossing thin thermoplastic films by the application of ultrasonic energy in conjunction with a liquid at the point of application of the ultrasonic energy to the sheet material was not contemplated by the Mitchell et al. patent. Moreover, the Mitchell et al. patent teaches away from such an application because the patent states the belief that aperture formation (physical effects) requires the presence of fibers to be rearranged.

DEFINITIONS

As used herein, the term "film" refers to a generally nonporous item that can be arranged in generally planar configuration which has a hydrostatic pressure (hydrohead) of at least about 100 centimeters of water when measured in accordance with Federal Test Method NO. 5514, standard no. 191A. This term is also intended to include multilayer materials which include at least one such film as a layer thereof.

As used herein, the term "thin film" refers to a film material having an average thickness generally of less than about ten (10) mils. Average thickness is determined by randomly selecting five (5) locations on a given film material, measuring the thickness of the film at each location to the nearest 0.1 mil, and averaging the five values (sum of the five values divided by five).

As used herein, the term "mesh count" refers to the number which is the product of the number of wires in a wire mesh screen in both the machine (MD) and cross-machine (CD) directions in a given unit area. For example, a wire mesh screen having 100 wires per inch in the machine direction and 100 wires per inch in the cross machine direction would have a mesh count of 10,000 per square inch. As a result of the interweaving of these wires, raised areas are present on both sides of the mesh screen. The number of raised areas on one side of such a wire mesh screen is generally one-half of the mesh count.

As used herein, the term "embossed area" refers to an area in a film which has been raised from the general plane of the film by at least the average thickness of the film. Importantly, the thickness of the film in the embossed area is substantially the same thickness as that of the unembossed areas of the film. The use of the term "substantially the same thickness" refers to an embossed area where the thickness of the embossed area, at no point, is less than about 90 percent of the average thickness of the unembossed area of the film. For example, the embossed area may have a thickness which, at no point, is less than about 95 percent of the average thickness of the unembossed area of the film. More particularly, the embossed area may have a thickness which, at no point, is less than about 99 percent of the average thickness of the unembossed area of the film.

As used herein, the term "degree of embossing" refers to the highest point an embossed area is raised above the general plane of the unembossed areas of a film. Thus, if a film is 1 mil in thickness, and the highest point of an embossed area is 1 mil above the plane of the unembossed area of the film, the degree of embossing would be 1 and would be sufficient to meet the definition of an "embossed area" contained herein. If the highest point of the embossed area was 2 mils above the plane of the unembossed area of the film, the degree of embossing would be 2. Likewise, if the highest point of the embossed area was 3 mils above the plane of the unembossed area of the film, the degree of embossing would be 3. Thus, the present invention is directed to the formation of embossed areas having a degree of embossing of at least about 1. For example, the degree of embossing may be at least about 5. More particularly, the degree of embossing may be at least about 10. Even more particularly, the degree of embossing may be at least about 20. Yet even more particularly, the degree of embossing may be at least about 30.

As used herein, the term "ultrasonic vibrations" refers to vibrations having a frequency of at least about 20,000 cycles per second. The frequency of the ultrasonic vibrations may range from about 20,000 to about 400,000 cycles per second.

As used herein, the term "thermoplastic material" refers to a high polymer that softens when exposed to heat and returns to its original condition when cooled to room temperature. Natural substances which exhibit this behavior are crude rubber and a number of waxes. Other exemplary thermoplastic materials include, without limitation, polyvinyl chloride, polyesters, nylons, polyfluorocarbons, polyolefins such as linear polyethylene, for example, linear low density polyethylene, polyurethane prepolymer and polypropylene.

As used herein, the term "hydrosonics" refers to the application of ultrasonic vibrations to a material where the area of such application has had a liquid applied thereto to the extent that the liquid is present in sufficient quantity to generally fill the gap between the tip of the ultrasonic horn and the surface of the material.

OBJECTS OF THE INVENTION

Accordingly, it is a general object of the present invention to provide a process for providing a pattern of embossed areas on a thin thermoplastic film material.

Yet a further object of the present invention is to provide a thin thermoplastic film material having a pattern of embossed areas.

Still further objects and the broad scope of applicability of the present invention will become apparent to those of skill in the art from the details given hereinafter. However, it should be understood that the detailed description of the presently preferred embodiments of the present invention is given only by way of illustration because various changes and modifications well within the spirit and scope of the invention will become apparent to those of skill in the art in view of this detailed description.

SUMMARY OF THE INVENTION

In response to the forgoing problems and difficulties encountered by those in the art, we have developed a method for forming a pattern of embossed areas in a thermoplastic film material having a thickness of about 10 mils or less. The method includes the steps of: (1) placing the thermoplastic film on a pattern anvil having a pattern of raised areas wherein the height of the raised areas is generally less than the thickness of the film; (2) conveying the thermoplastic film, while placed on the pattern anvil, through an area where a liquid is applied to the film; and (3) subjecting the thermoplastic film to a sufficient amount of ultrasonic vibrations in the area where the liquid is applied to the thin film material to emboss at least a portion of the film in a pattern generally the same as the pattern of raised areas on the pattern anvil.

In some embodiments, the liquid may be selected from the group including one or more of water, mineral oil, a chlorinated hydrocarbon, ethylene glycol or a solution of 50 volume percent water and 50 volume percent 2 propanol. For example, the chlorinated hydrocarbon may be either 1,1,1 trichloroethane or carbon tetrachloride.

While the pattern anvil may be configured to form any desirable pattern, it may, in some embodiments, be selected from the group consisting of a mesh screen, a flat plate with raised areas and a cylindrical roller with raised areas.

In some embodiments, the film is embossed only in selected predesignated areas.

The embossed areas may have any desirable geometrical configuration such as, for example, square, triangle, linear or circular, and may be present in the number per unit area desired.

In some embodiments of the invention a thin thermoplastic film is provided with at least about 100 embossed areas per square inch over at least a portion thereof. For example, the film may have at least about 1,000 embossed areas per square inch over at least a portion thereof. More particularly, the film may have at least about 5,000 embossed areas per square inch over at least a portion thereof.

In some embodiments, the area of each of the embossed areas may generally range from at least about 100,000 square micrometers to about 500,000 square micrometers. For example, the area of each of the embossed areas may generally range from at least about 200,000 square micrometers to about 400,000 square micrometers. More particularly, the area of each of the embossed areas may generally range from at least about 250,000 square micrometers to about 350,000 square micrometers.

In some embodiments of the invention the embossed areas have a degree of embossing of at least about 5. For example, the embossed areas may have a degree of embossing of at least about 10. More particularly, the embossed areas may have a degree of embossing of at least about 20.

THE FIGURES

DETAILED DESCRIPTION OF THE INVENTION

Figure 1:
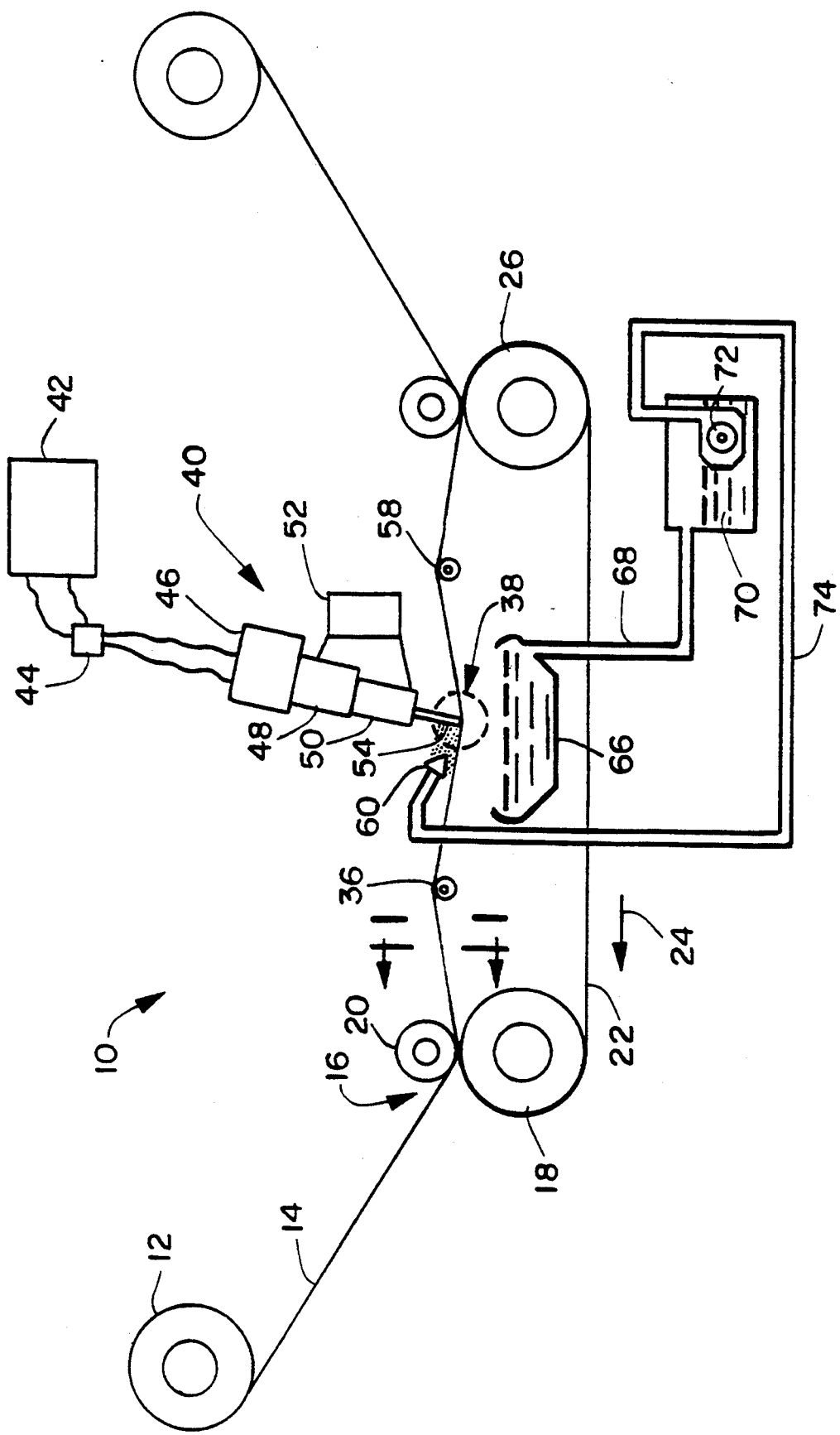
FIG. 1 is a schematic representation of apparatus which may be utilized to practice the embossing process of the present invention.

Turning now to the figures where like reference numerals represent like structure and, in particular to FIG. 1 which is a schematic representation of an apparatus which can carry out the embossing method of the present invention, it can be seen that the apparatus is generally represented by the reference numeral 10. In operation, a supply roll 12 of a thin thermoplastic film 14 to be area embossed is provided. As has been previously stated, the term thin film refers to sheet materials which have an average thickness of about ten (10) mils or less. Additionally, generally speaking, the average thickness of the thin thermoplastic film 14 will be at least about 0.25 mil. For example, the average thickness of the thin thermoplastic film 14 may range from about 0.25 mil to about 5 mils. More particularly, the average thickness of the thin thermoplastic film 14 may range from about 0.25 mil to about 2 mils. Even more specifically, the average thickness of the thin thermoplastic film 14 may range from about 0.5 mil to about 1 mil.

The thin thermoplastic film 14 may be formed from a material selected from the group including one or more polyolefins, polyurethanes, polyesters, A-B-A' block copolymers where A and A' are each a thermoplastic polymer endblock which includes a styrenic moiety and where A may be the same thermoplastic polymer endblock as A', and where B is an elastomeric polymer midblock such as a conjugated diene or a lower alkene or ethylene vinyl acetate copolymer. The polyolefin may, for example, be selected from the group including one or more of linear low density polyethylene, polyethylene or polypropylene. The thermoplastic film may be a filled film with the filled film being selected from the group including a polyethylene film filed with starch, titanium dioxide, wax, carbon or calcium carbonate.

The thin thermoplastic film 14 is transported to a first nip 16 formed by a first transport roll 18 and a first nip roller 20 by the action of an endless mesh transport wire 22 which moves in the direction indicated by the arrow 24. The mesh transport wire 22 is driven by the rotation of the first transport roller 18 in conjunction with a second transport roller 26 which, in turn, are driven by a conventional power source, not shown.

Figure 2:
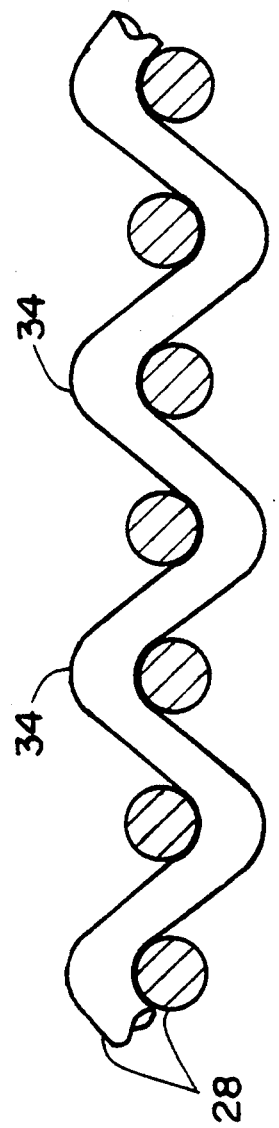
FIG. 2 is a cross sectional view of the transport mechanism depicted in FIG. 1, taken along lines 1—1 in FIG. 1.

FIG. 2 is a cross sectional view of the mesh transport wire 22 taken along lines 1—1 in FIG. 1. FIG. 2 discloses that the mesh transport wire 22 is a heavy duty transport wire which usually has a mesh count of less than about 400 (i.e. less than about 20 wires per inch by 20 wires per inch mesh screen if machine direction (MD) and cross machine direction (CD) wire count is the same). Heavy duty mesh wire screens of this type may be made from a variety of materials such as, for example, metals, plastics, nylons or polyesters, and are readily available to those in the art.

From the first nip 16 the thin thermoplastic film 14 is transported by the transport mechanism 22 over a tension roll 36 to an area 38 (defined in FIG. 1 by the dotted lined circle) where the thin thermoplastic film 14 is subjected to ultrasonic vibrations.

The assembly for subjecting the thin thermoplastic film 14 to the ultrasonic vibrations is conventional and is generally designated at 40. The assembly 40 includes a power supply 42 which, through a power control 44, supplies power to a piezoelectric transducer 46. As is well known in the art, the piezoelectric transducer 46 transforms electrical energy into mechanical movement as a result of the transducer's vibrating in response to an input of electrical energy. The vibrations created by the piezoelectric transducer 46 are transferred, in conventional manner, to a mechanical movement booster or amplifier 48. As is well known in the art, the mechanical movement booster 48 may be designed to increase the amplitude of the vibrations (mechanical movement) by a known factor depending upon the configuration of the booster 48. In further conventional manner, the mechanical movement (vibrational energy) is transferred from the mechanical movement booster 48 to a conventional knife edge ultrasonic horn 50. It should be realized that other types of ultrasonic horns 50 could be utilized. For example, a rotary type ultrasonic horn could be used. The ultrasonic horn 50 may be designed to effect yet another boost or increase in the amplitude of the mechanical movement (vibrations) which is to be applied to the thin sheet material 14. Lastly, the assembly includes an actuator 52 which includes a pneumatic cylinder, not shown. The actuator 52 provides a mechanism for raising and lowering the assembly 40 so that the tip 54 of the ultrasonic horn 50 can apply tension to the transport mechanism 22 upon the assembly 40 being lowered. It has been found that it is necessary to have some degree of tension applied to the transport mechanism 22 upon the lowering of the assembly for proper application of vibrational energy to the thin thermoplastic film 14 to form embossed areas in the thin thermoplastic film 14. Another necessary parameter is that the assembly 40 must be provided with a positive stop mechanism which limits the degree of ultrasonic energy that is applied to the thermoplastic film 14. Thus, the assembly is set up so that there is a positive stop on the downward movement of the ultrasonic horn after the tip 54 of the horn 50 has lightly touched the mesh transport wire or other template 28. One desirable aspect of this tensioned arrangement is that it eliminates the need to design a finely toleranced gap between the tip 54 of the horn 50 and the raised areas or knuckles 34 of the mesh transport wire 28.

Figure 3:
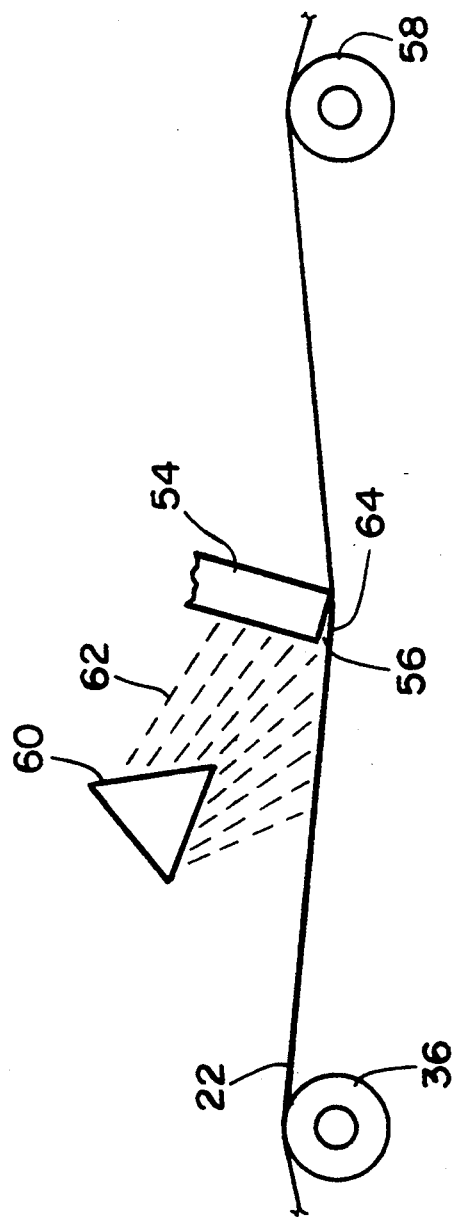
FIG. 3 is a schematic representation of the area 38 depicted in FIG. 1 where the ultrasonic vibrations are applied to the thin thermoplastic film.

FIG. 3 is a schematic representation of the area 38 where the ultrasonic vibrations are applied to the thin thermoplastic film 14. As can be seen in FIG. 3, the transport wire 22 forms an angle 56 with the tip 54 of the ultrasonic horn 50. While some area embossing will occur if the angle 56 is as great as 45 degrees, it has been found that it is desirable for the angle 56 to range from about 5 degrees to about 15 degrees. For example, the angle 56 may range from about 7 to about 13 degrees. More particularly, the angle 56 may range from about 9 to about 11 degrees.

FIG. 3 also illustrates that the transport wire 22 is supported from below by the first tension roll 36 and a second tension roll 58. Positioned somewhat prior to the tip 54 of the ultrasonic horn 50 is a spray nozzle 60 which is configured to apply a liquid 62 to the surface of the thin thermoplastic film 14 just prior to the film's 14 being subjected to ultrasonic vibrations by the tip 54 of the ultrasonic horn 50. The liquid 62 desirably may be selected from the group including one or more of water, mineral oil, a chlorinated hydrocarbon, ethylene glycol or a solution of 50 volume percent water and 50 volume percent 2 propanol. For example, in some embodiments the chlorinated hydrocarbon may be selected from the group including 1,1,1 trichloroethane or carbon tetrachloride. It should be noted that the wedge-shaped area 64 formed by the tip 54 of the ultrasonic horn 50 and the transport mechanism 22 should be subjected to a sufficient amount of the liquid 62 for the liquid 62 to act as both a heat sink and a coupling agent for the most desirable results. Positioned below the transport wire 22 in the area where the tip 54 of the ultrasonic horn 50 is located is a liquid collection tank 66. (See FIG. 1.) The liquid collection tank 66 serves to collect liquid 62 which has been applied to the surface of the thin thermoplastic film 14 and which has been driven over the edges of the transport mechanism 22 by the action of the vibrations of the tip 54 of the ultrasonic horn 50. Liquid 62 which is collected in the collection tank 66 is transported by tubing 68 to a liquid holding tank 70.

FIG. 1 illustrates that the liquid holding tank 70 contains a pump 72 which, by way of additional tubing 74, supplies the liquid 62 to the liquid spray nozzle 60. Accordingly, the liquid 62 may be recycled for a considerable period of time.

While the mechanism of action may not be fully understood and the present application should not be bound to any particular theory or mechanism of action, it is believed that the presence of the liquid 62 in the wedge-shaped area 64 during operation of the ultrasonic horn 50 accomplishes two separate and distinct functions. First, the presence of the liquid 62 allows the liquid 62 to act as a heat sink which allows the ultrasonic vibrations to be applied to the thin thermoplastic film 14 without the thin film 14 being altered or destroyed as by melting. Secondly, the presence of the liquid 62 in the wedge-shaped area 64 allows the liquid 62 to act as a coupling agent in the application of the vibrations from the ultrasonic horn 50 to the thin thermoplastic film 14.

It has been discovered that, with appropriate application of ultrasonic energy per unit area of the thermoplastic film, the action of the ultrasonic horn 50 on the thin thermoplastic film 14 embosses areas in the film 14. The embossed areas are raised from the surface of the thin film 14 in the pattern of the transport wire or other template 28 that has been used.

Where the template is a mesh wire, the raised areas or knuckles 34 of the mesh wire pattern wire 28 generally form the embossed areas. Generally, the number of embossed areas produced will be equal to the number of raised areas or knuckles 34 on the upper surface of the mesh wire 28. That is, the number of embossed areas will generally be one-half the mesh count of a given area of pattern wire 28. For example, if the pattern wire 28 is 20 wires per inch MD by 20 wires per inch CD, the total number of knuckles or raised areas 34 on one side of the pattern wire 28 per square inch will be 20 times 20 divided by 2. This equals 200 embossed areas per square inch. For a 50 wires per inch MD by 50 wires per inch CD pattern wire 28 the calculation yields 1,250 embossed areas per square inch. For a 100 wires per inch MD by 100 wires per inch CD pattern wire 28 the calculation yields 5,000 embossed areas per square inch.

It should also be noted that the number of embossed areas formed may also vary with the number of ultrasonic vibrations to which the thin thermoplastic 14 is subjected per unit area for a given period of time. This factor may be varied in a number of ways. For example, the number and size of the embossed areas will vary somewhat with the line speed of the thin thermoplastic film 14 as it passes underneath the tip 54 of the ultrasonic horn 50. Generally speaking, as line speed increases, first the size and height of the embossed areas decreases and then the number of embossed areas decreases. As the number of embossed areas decreases, the less the pattern of embossed areas resembles the pattern of raised areas 34 on the transport wire 28.

It should be recognized that some slight experimentation may be necessary to determine an appropriate combination of variables which yield embossed areas. For example, embossed area formation will vary with, for example, (1) the thickness and type of thermoplastic film used; (2) the line speed the apparatus is operated at; and (3) the liquid used.

For polyethylene film having a thickness of about 1 mil, typical line speeds which are believed to yield embossed areas for a wide variety of liquids range from about 4 to about 20 feet per minute. If water is used as the liquid with such polyethylene film, typical line speeds which are believed to yield embossed areas range from about 4 to about 20 feet per minute.

It should be understood that one limitation on the present embossing process is the degree of elasticity of the thin thermoplastic film 14. If the film 14 is formed from a highly elastic material it may be very difficult, if not impossible, to area emboss the material. This is due to the fact that, due to extreme resilience, the material will return to generally its original shape after being transiently embossed. Thus, the embossed areas are initially formed but soon disappear due to the memory of the highly elastic sheet material.

It is believed that, to some extent, the variations in the number of embossed areas formed and the size of the embossed areas occurs due to the minute variations in the height of the raised areas or knuckles 34 of the mesh pattern wire 28. It should be noted that the mesh pattern wires used to date have been obtained from conventional everyday sources such as a hardware store. It is also believed that if a pattern wire 28 could be created where all of the raised areas 34 of the wire 28 were of exactly the same height, these variations would only occur in uniform fashion with variations of line speed.

As was stated above, the area or size of each of the embossed areas formed will also vary with the parameters discussed above. The area of the embossed areas will also vary with the area of the raised areas of the pattern anvil such as the knuckles 34 on the transport wire 28. It is believed that the type of material used in forming the thin thermoplastic film 14 will also vary the area of the embossed areas formed if all other parameters are maintained the same. For example, the softer the thin thermoplastic film 14, the easier it is to push the thin thermoplastic film 14 onto the raised areas of the transport wire 28.

Application of excessive ultrasonic force should be avoided because the raised areas (knuckles) on the mesh wire 28 are generally pyramidal in shape. Thus, the more ultrasonic force that is applied, the deeper the raised area penetrates the thin thermoplastic film 14 and the greater the likelihood that the embossed area will be thinned or apertured. Typically, the height of the raised areas or knuckles should be less than the thickness of the thermoplastic film 14 for embossed areas to be formed.

Where embossing of a soft film such as, for example, polyethylene, having an average thickness of less than about 1.0 mil is to be practiced, it is usually desirable to place a dampening mechanism on the transport wire 28 prior to the placement of the thin film thereon. An example of such a dampening mechanism is the placement of a thin film of natural rubber on the surface of the transport wire 28 and then placing the film to be embossed on top of the film of natural rubber. The resilience of the natural rubber film acts as a shock absorber and generally prohibits the knuckles 34 of the wire 28 from thinning or aperturing the film 14.

In some embodiments it may be necessary to subject the thin thermoplastic film 14 to multiple passes through the apparatus 10 in order to emboss areas in the thin film 14 to the degree desired. In such situations the thin film 14 will initially only be embossed to a slight degree in the pattern of the pattern anvil's raised areas. However, two or more passes through the apparatus 10, with the thin sheet material 14 being aligned in the same configuration with respect to the pattern anvil will yield areas embossed to the degree desired. Essentially, what is happening in these situations is that the film 14 is repeatedly embossed by repeated application of ultrasonic vibrational force until such time as areas which are embossed to the desired degree are formed. Care should be taken that the areas are not thinned or apertured by repeated application of hydrosonic vibrations.

Another feature of the present invention is the fact that the embossed areas can be formed in a predesignated area or areas of the thin thermoplastic film 14. This can be accomplished in a number of ways. For example, the thin thermoplastic film 14 may be subjected to ultrasonic vibrations only at certain areas of the film, thus, area embossing would occur only in those areas. Alternatively, the entire thin film could be subjected to ultrasonic vibrations with the pattern anvil having raised areas only at certain locations and otherwise being flat. Accordingly, the thin film 14 would have embossed areas only in those areas which corresponded to areas on the pattern anvil having raised areas.

It should also be noted that some limitation exists in the number of embossed areas which can be formed in a given thin thermoplastic film 14 on a single application of hydrosonic vibrational energy, i.e. a single pass through the apparatus if a wire mesh screen is used as the pattern anvil. This follows from the fact that the height of the raised areas must be sufficient to effect some embossing of the thin film 14 in conjunction with the fact that, generally as the mesh count increases, the height of the raised areas or knuckles decreases. In such situations, if the number of embossed areas desired per unit area is greater than the number which can be formed in one pass through the apparatus, multiple passes are necessary with the alignment of the thin film 14 with respect to the raised areas being altered or shifted slightly on each pass.

Generally speaking, the area of each of the embossed areas ranges from at least about 100,000 to about 500,000 square micrometers. That is the area of each of the embossed areas may range from at least about 200,000 to about 400,000 square micrometers. For example, the area of each of the formed embossed areas may generally range from at least about 250,000 to about 350,000 square micrometers.

The degree of embossing can, to a certain extent be varied by varying the various parameters discussed above. For example, the degree of embossing may be such that the embossed area is raised at least twice the thickness of the film 14 above the general plane of the unembossed areas of the film 14. More particularly, the degree of embossing may be such that the embossed area is raised at least three times the thickness of the film 14 above the general plane of the unembossed areas of the film 14. Even more particularly, the degree of embossing may be at least about 5. For example, the degree of embossing may be at least about 10. Yet even more particularly, the degree of embossing may be at least about A number of important observations about the process may now be made. For example, it should be understood that the presence of the liquid 62 is highly important to the present inventive process which uses the liquid as a coupling agent. Because a coupling agent is present, the embossed areas are molded or punched into the thin thermoplastic film 14 as opposed to being formed by softening or melting. Because the vibrating tip 54 of the ultrasonic horn 50 is acting in a hammer and anvil manner when operated in conjunction with the heavy duty wire mesh screen 28, it should be readily recognized that a certain degree of tension must be placed upon the transport mechanism 22 by the downward displacement of the ultrasonic horn by 50. If there is little or no tension placed upon the transport wire, it cannot perform its function as an anvil and embossing generally does not occur. It should be easily recognized by those in the art that the anvil function of the transport wire 28 can be accomplished by other arrangements. For example, a flat plate with raised portions acting to direct the area embossing force of the ultrasonic horn 50 could be placed upon the transport wire 28. Alternatively, a cylindrical roller having raised areas could be substituted for the wire 28. If the pattern anvil is a cylindrical roller with raised areas, it is desirable for the pattern anvil to be wrapped or coated with or made from a resilient material. Where the pattern anvil is a mesh screen, the resiliency is provided by the fact that the screen is unsupported directly below the point of application of ultrasonic vibrations to the mesh screen.

As has been previously stated, another important point is that the assembly 40 is provided with a positive stop mechanism whereby the downward movement of the tip 54 of the ultrasonic horn 50 is positively arrested while only a limited amount of pressure is applied to the mesh transport wire 28. This action prohibits the mechanical movement of the tip 54 of the ultrasonic horn 50 from being so great as to aperture as compared to emboss the thermoplastic film 14.

Depending upon the material used to form the film 14, the degree of embossing of each embossed area and the number of embossed areas per square inch of the film 14, it is possible that the strength of the film 14 may be degraded upon being embossed.

The invention will now be discussed with regard to specific examples which will aid those of skill in the art in a full and complete understanding thereof.

EXAMPLE I

A sheet of 0.5 mil thick polyethylene film (S/E-702) was obtained from the Edison Corporation of Plainfield, N.J. and was cut into a length of about 10 inches and a width of about 8 inches. It should be noted that due to the thickness and consistency of the polyethylene film sample, a sheet of 1.0 mil thick natural rubber obtained from the J. P. Stevens Company of North Hampton, Mass., was placed directly on the 20 by 20 mesh transport wire. This was done to mute, that is dampen, the effect of the knuckles of the transport wire on the polyethylene film during the hydrosonic process. Thereafter the sample was placed on the 20 by 20 wire mesh transport wire so that it could be subjected to hydrosonic treatment in accordance with the present invention.

A model 20A2000 ultrasonic unit from the Dukane Company of St. Charles, Ill. was utilized to supply the ultrasonic energy. The 20A2000 unit was supplied with about 400 watts of electrical energy.

The output end of the 20A2000 unit was connected to an ultrasonic horn which was also obtained from the Dukane Company. The horn in this example was made of titanium with a working face of about 9 inches by about ½ inch. The leading and trailing edges of the working face of the horn are each curved on a radius of about ⅛ inch. The horn step area is exponential in shape and yields about a two-fold increase in the mechanical movement of the booster. That is, the horn step area has about a 1:2 gain ratio. This configuration results in a mechanical movement of the tip of the ultrasonic horn of about 4.0 micrometers.

The forming table arrangement included a small forming table which was utilized to transport and support the polyethylene film to be embossed. The forming table included two 2-inch diameter idler rollers which were spaced about 12 inches apart on the surface of the forming table. The transport wire encircles the two idler rollers so that a continuous conveying or transport surface is created. The transport wire was a square weave polyester 20×20 mesh web of 0.020 inch diameter plastic filaments The transport wire was about 10 inches wide and was raised above the surface of the forming table.

The 20A2000 unit includes an actuator. When power is switched on to the 20A2000 unit, the actuator, by means of a pneumatic cylinder with a piston area of about 4.4 square inches, lowers the assembly so that the output end of the horn contacts the polyethylene film which is to be embossed. The actuator also raises the assembly so that the output end of the horn is removed from contact with the polyethylene film when the power is switched off. The assembly is positioned so that the output end of the horn is adapted so that it may be lowered to contact the transport wire between the two idler rollers.

The forming table arrangement also included a liquid circulating system. The circulating system includes a liquid reservoir tank, a liquid circulating pump which may conveniently be located within the tank, associated tubing for transporting the liquid from the tank to a slotted boom which is designed to direct a curtain of liquid into the juncture of the output end of the horn and polyethylene film which is to be embossed.

In operation, the assembly was positioned so that the output end of the horn was at an angle of from about 10 to 15 degrees to the polyethylene film. Accordingly, a wedge shaped chamber was formed between the output end of the horn and the polyethylene film. It is into this wedge shaped chamber that the liquid, in this example water at room temperature, is directed by the slotted boom.

It should be noted that the actuator was positioned at a height to insure that, when the assembly is lowered, the downward movement of the output end of the horn is stopped by a positive stop mechanism before a great degree of tension was placed on the transport mesh. Accordingly, only a limited degree of mechanical energy is transferred to the polyethylene film by the action of the tip of the ultrasonic horn because the transport mesh is able, to a certain degree, to move backwards in response to the ultrasonic vibrations coming from the tip of the ultrasonic horn. In this example the light transfer of mechanical energy transfer was also assisted by positioning the tip of the ultrasonic horn so that the transport wire was depressed about one-eighth (⅛) inch.

The sequence of operation was (1) the liquid pump was switched on and the area where the output end of the horn was to contact the polyethylene film was flooded with water; (2) the transport wire conveyor system was switched on and the polyethylene started moving at about 8 feet per minute; and (3) power to the assembly was supplied and the assembly was lowered so that the tip of the horn contacted the sheet of polyethylene film while the film continued to pass under the output end of the horn until the end of the sample was reached. As has been previously stated, the actuator was adjusted so that (1) a positive stop mechanism prohibited a complete transfer of ultrasonic energy to the polyethylene film and (2) the transport wire was depressed about ⅛ of an inch.

This example yielded an embossed polyethylene film having a maximum density of about 400 embossed areas per square inch with each embossed area having an area of about 350,000 square micrometers with a maximum displaced height of about 200 micrometers which equals a degree of embossing of the embossed areas of about 16.

Figure 4:
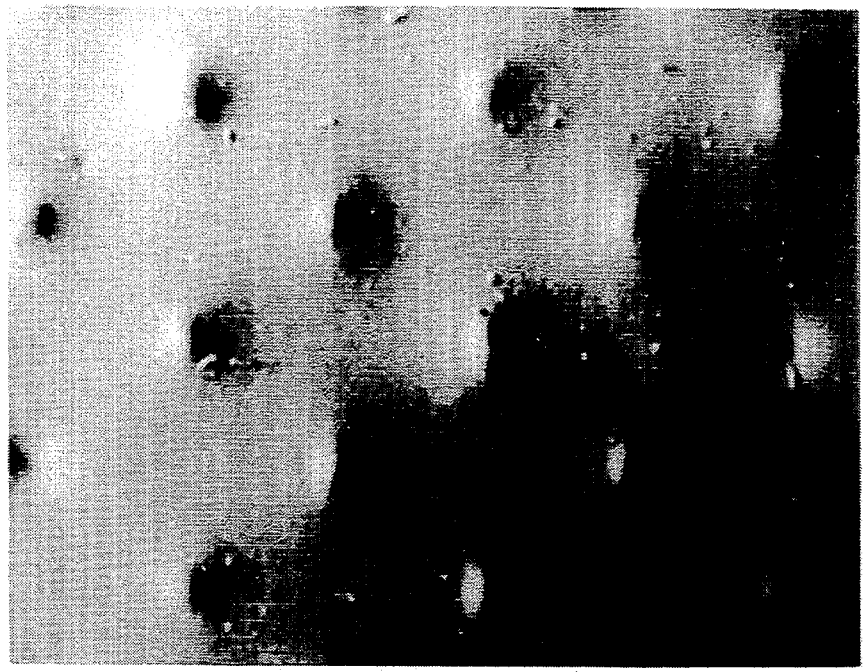
FIG. 4 is a top plan photomicrograph of a thin thermoplastic film material which has been embossed in accordance with the teachings of the present invention.

FIG. 4 is a planar photomicrograph of the embossed polyethylene film which was formed in accordance with the process of Example I.

Figure 5:
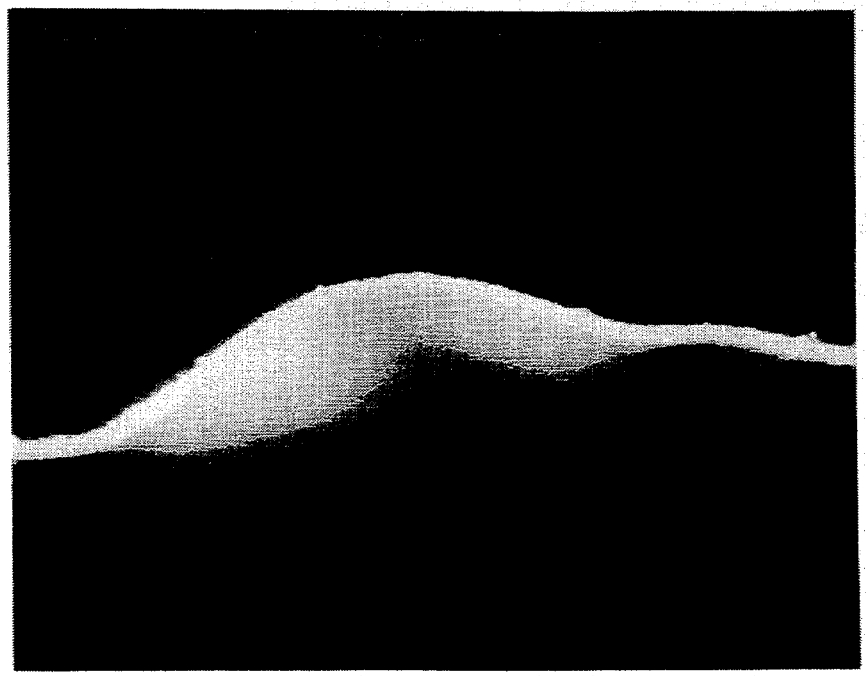
FIG. 5 is a cross-sectional photomicrograph of the thin thermoplastic film material of FIG. 4.

FIG. 5 is a cross-sectional photomicrograph of the embossed polyethylene film which was formed in accordance with the process of Example I.

EXAMPLE II

Another example was conducted with the same process parameters as Example I with the exception that 1.0 mil thick Edison SE-702 polyethylene film was embossed.

This example yielded an embossed polyethylene film having a maximum density of about 400 embossed areas per square inch with each embossed area having an area of about 350,000 square micrometers with a maximum displaced height of about 75 micrometers which equals a degree of embossing of the embossed areas of about 3.

EXAMPLE III

Another example was conducted with the same process parameters as Example I with the exception that 0.5 mil thick Phanex polyester film obtained from the Pilcher Hamilton Corp. of Broadview, Ill. was embossed. In this example, the 1.0 mil thick natural rubber film was not utilized. That is the polyester sample was placed directly upon the 20 by 20 transport wire. Additionally, the 20A2000 unit utilized about 600 watts. It was very difficult to emboss this film.

This example yielded an embossed polyester film having a maximum density of about 400 embossed areas per square inch with each embossed area having an area of about 140,000 square micrometers with a maximum displaced height of about 40 micrometers which equals a degree of embossing of the embossed areas of about 3.

EXAMPLE IV

Another example was conducted with the same process parameters as Example I with the exception that 1.0 mil thick Dupont (Canada) "Evlon" film was placed over the rubber film and processed. The first pass produced large holes at each knuckle point. A second sheet of Evlon material was placed on the rubber film and the mechanical stop was raised to the point that the tip of the ultrasonic horn did not touch the Evlon film. Successive passes were then made on the same sample, lowering the tip of the horn about 0.010 inch on each pass. At about 0.040 inch deflection of the transport wire, embossments were made on the film. The film appeared to be somewhat elastic with a strong memory and the resulting embossed areas were very low in displacement to area ratio.

This example yielded an embossed Evlon film having a maximum density of about 400 embossed areas per square inch with each embossed area having an area of about 185,000 square micrometers with a maximum displaced height of about 40 micrometers which equals a degree of embossing of the embossed areas of about 1.5.

EXAMPLE V

Another example was conducted with the same process parameters as Example I with the exception that 1.2 mil thick cellophane material obtained under the designation "Flexel" from the Flexel Corp. of Atlanta, Ga., (#160PUT76). As in Example II, the natural rubber film was not used and the Flexel film was placed directly upon the 20 by 20 transport wire The ultrasonic equipment used about 450 watts of energy in this example.

This example yielded an embossed cellophane film having a maximum density of about 400 embossed areas per square inch with each embossed area having an area of about 280,000 square micrometers with a maximum displace height of about 140 micrometers which equals a degree of embossing of the embossed areas of about 5.

The uses to which the embossed thermoplastic film of the present invention may be put are numerous. For example, the presence of the embossed areas can yield a film which has different tactile characteristics than an unembossed film. Additionally, the embossed film may prove to be quieter in movement or folding when the film is used in a garment. Other uses of the embossed film include designs to identify the supplier, to make the film more attractive, to change the frictional character of the film or to add bulk to the film.

It is to be understood that variations and modifications of the present invention may be made without departing from the scope of the invention. For example, in some embodiments the use of multiple ultrasonic horns aligned abreast or sequentially may be desirable. It is also to be understood that the scope of the present invention is not to be interpreted as limited to the specific embodiments disclosed herein, but only in accordance with the appended claims when read in light of the foregoing disclosure.

What is claimed is:

1. A method for forming a pattern of embossed areas in a thermoplastic film material having a thickness of about 10 mils or less, the method comprising the steps of:
   (a) placing the thermoplastic film on a pattern anvil having a pattern of raised areas wherein the height of the raised areas is generally less than the thickness of the film;
   (b) conveying the thermoplastic film, while placed on the pattern anvil, through an area where a liquid is applied to the film; and
   (c) subjecting the thermoplastic film to a sufficient amount of ultrasonic vibrations in the area where the liquid is applied to the film material to emboss at least a portion of the film in a pattern generally the same as the pattern of raised areas on the pattern anvil.

2. The method of claim 1, wherein the liquid is selected from the group consisting of one or more of water, mineral oil, a chlorinated hydrocarbon, ethylene glycol or a solution of 50 volume percent water and 50 volume percent 2 propanol.

3. The method of claim 2, wherein the chlorinated hydrocarbon is selected from the group consisting of 1,1,1 trichloroethane and carbon tetrachloride.

4. The method of claim 1, wherein the pattern anvil is selected from the group consisting of a mesh screen, a flat plate with raised areas and a cylindrical roller with raised areas.

5. The method of claim 1, wherein the thermoplastic film is embossed only in selected predesignated areas.

6. The method of claim 1, wherein a dampening means is placed between the pattern anvil and the thermoplastic film during embossing.

7. The method of claim 1, wherein the thermoplastic film is provided with at least about 100 embossed areas per square inch over at least a portion thereof.

8. The method of claim 1, wherein the thermoplastic film is provided with at least about 1,000 embossed areas per square inch over at least a portion thereof.

9. The method of claim 1, wherein the thermoplastic film is provided with at least about 5,000 embossed areas per square inch over at least a portion thereof.

10. The method of claim 1, wherein the area of each of the embossed areas ranges from at least 100,000 square micrometers to about 500,000 square micrometers.

11. The method of claim 1, wherein the area of each of the embossed areas ranges from at least 200,000 square micrometers to about 400,000 square micrometers.

12. The method of claim 1, wherein the area of each of the embossed areas ranges from at least 250,000 square micrometers to about 350,000 square micrometers.

13. The method of claim 1, wherein the thermoplastic film has a degree of embossing of at least about 5.

14. The method of claim 1, wherein the thermoplastic film has a degree of embossing of at least about 10.

15. The method of claim 1, wherein the thermoplastic film has a degree of embossing of at least about 20.

16. The method of claim 1, wherein the thermoplastic film has a degree of embossing of at least about 30.

17. The method of claim 1, wherein the thickness of the embossed areas of the thermoplastic film, at no point, is less than 95 percent of the average thickness of the unembossed area of the thermoplastic film.

18. The method of claim 1, wherein the thickness of the embossed areas of the thermoplastic film, at no point, is less than 99 percent of the average thickness of the unembossed area of the thermoplastic film.

19. The method of claim 1, wherein the thermosplastic film is formed from a material selected from the group consisting of crude rubber, waxes, polyvinyl chloride, polyesters, nylons, polyfluorocarbons, polyurethane prepolymer and polyolefins.

20. The method of claim 1, wherein the thermoplastic film is formed from a polyolefin.

21. The method of claim 20, wherein the polyolefin is selected from the group consisting of linear polyethylene and polypropylene.

22. The method of claim 21, wherein the linear polyethylene is linear low density polyethylene.

23. A method for forming a pattern of embossed areas in a thermoplastic film material having an average thickness of from about 0.25 mil to about 5 mils, the method comprising the steps of:
 (a) placing a dampening means on a mesh screen having a pattern of raised areas wherein the height of the raised areas is generally less than the thickness of the film;
 (b) placing the thermoplastic film on the dampening means;
 (c) conveying the thermoplastic film, while placed on the dampening means, through an area where a liquid selected from the group consisting of one or more of water, mineral oil, a chlorinated hydrocarbon, ethylene glycol or a solution of 50 volume percent water and 50 volume percent 2 propanol is applied to the film; and
 (d) subjecting the thermoplastic film to a sufficient amount of ultrasonic vibrations in the area where the liquid is applied to the film material to provide at least about 1,000 embossed areas per square inch over at least a portion of the film material in a pattern generally the same as the pattern of raised areas on the mesh screen; and
 wherein the area of each of the embossed areas ranges from at least about 100,000 square micrometers to about 500,000 square micrometers.

24. The method of claim 23, wherein the dampening means is a thin film of natural rubber.

25. A method for forming a pattern of embossed areas in a thermoplastic film material having an average thickness of from about 0.25 mil to about 2 mils, the method comprising the steps of:
 (a) placing a dampening means on a mesh screen having a pattern of raised areas wherein the height of the raised areas is generally less than the thickness of the film;
 (b) placing the thermoplastic film on the dampening means;
 (c) conveying the thermoplastic film, while placed on the dampening means, through an area where a liquid selected from the group consisting of one or more of water, mineral oil, a chlorinated hydrocarbon, ethylene glycol or a solution of 50 volume percent water and 50 volume percent 2 propanol is applied to the film; and
 (d) subjecting the thermoplastic film to a sufficient amount of ultrasonic vibrations in the area where the liquid is applied to the film material to provide at least about 1,000 embossed areas per square inch over at least a portion of the film material in a pattern generally the same as the pattern of raised areas on the mesh screen; and
 wherein the area of each of the embossed areas ranges from at least about 100,000 square micrometers to about 500,000 square micrometers.

26. The method of claim 25, wherein the dampening means is a thin film of natural rubber.

* * * * *

UNITED STATES PATENT AND TRADEMARK OFFICE
CERTIFICATE OF CORRECTION

PATENT NO. : 5,336,452
DATED : August 9, 1994
INVENTOR(S) : Bernard Cohen; Lee K. Jameson It is certified that error appears in the above-identified patent and that said Letters Patent is hereby corrected as shown below:

Column 2, line 36, "developed For'" should read --developed. For--;

Column 8, line 4, "results. Positioned" should read --results. (new paragraph) Positioned--;

Column 11, line 3, "about" should read --about 20.--;

Column 11, line 65, "Thereafter the" should read --Thereafter, the--;

Column 12, line 26, "filaments The" should read --filaments. The--;

Column 14, line 25, "wire The" should read --wire. The--;

Column 16, line 55, "about 1,000" should read --about 5,000--.

Signed and Sealed this

Twenty-fourth Day of October, 1995

Attest:

BRUCE LEHMAN

Attesting Officer     Commissioner of Patents and Trademarks